July 30, 1968 — C. E. MEYERHOEFER — 3,394,904
CORD LOCK MECHANISM

Filed Oct. 18, 1965 — 2 Sheets-Sheet 1

INVENTOR.
Carl E. Meyerhoefer
BY

July 30, 1968   C. E. MEYERHOEFER   3,394,904
CORD LOCK MECHANISM

Filed Oct. 18, 1965   2 Sheets-Sheet 2

INVENTOR.
Carl E. Meyerhoefer
BY 3,394,904
CORD LOCK MECHANISM
Carl E. Meyerhoefer, Little Neck, N.Y., assignor to The Regina Corporation, Rahway, N.J., a corporation of Delaware
Filed Oct. 18, 1965, Ser. No. 497,025
4 Claims. (Cl. 242—107.2)

ABSTRACT OF THE DISCLOSURE

Disclosed is an integrally formed cord release mechanism in a floor care machine that prevents the power cord from being wound on a reel under spring urging unless freed by movement of a foot pedal, and means for inserting the cord in the wall of the housing of the machine.

---

This invention relates to a cord lock mechanism for gripping and releasing a tension subjected cord.

It is particularly useful in connection with an electric cord wound on a spring biased reel such as those employed in ambulatory household appliances of the floor borne type. In the use of such an appliance its distance from an electric outlet varies, thus requiring various extended cord lengths.

One object of this invention is to provide means for effectively controlling the length of cord wound on a spring biased reel.

Another object is to permit the cord to be retracted by means of a foot pedal to obviate the need for the operator to bend over or to use hands that might be otherwise engaged.

A further object is to enable the economic assembly or a unit embodying this invention, into an appliance.

Other applications and objects of this invention will appear from the description which follows.

Illustrated is the incorporation of this cord lock mechanism in a floor borne appliance.

In the drawings.

In the drawings the same reference number refers to the same or a similar part.

Figure 1:
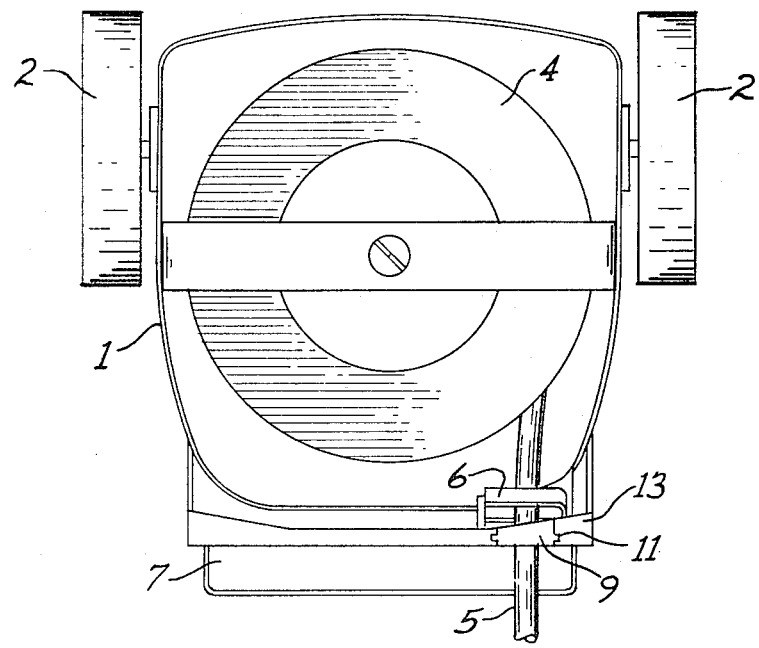
FIGURE 1 is a top view of the carriage of an ambulatory electric household appliance showing the cord in locked condition.
Figure 2:
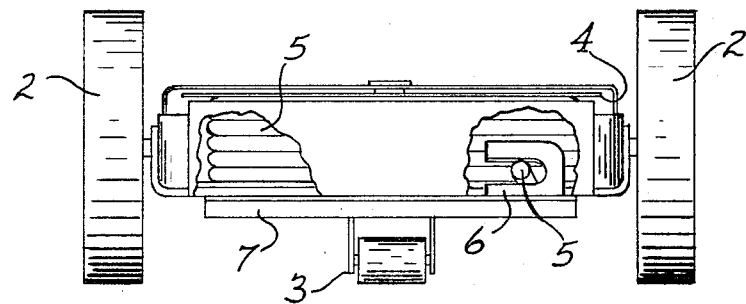
FIGURE 2 is a rear view of the lower portion of the carriage of FIGURE 1 with a portion cut away to show the cord reel within the carriage.
Figure 3:
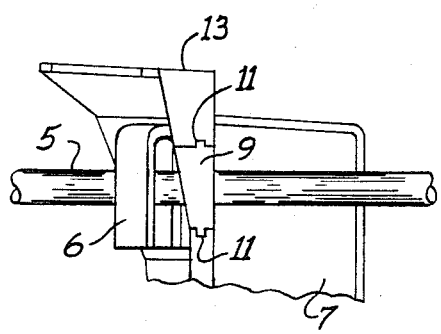
FIGURE 3 is a fragmentary top view of the carriage showing the cord unlocked.

Carriage 1 which carries the conventional parts of an appliance is supported on wheels 2 and roller 3. Housed on the carriage is a spring biased reel 4 around which cord 5 is wound. The free end of the cord passes through hole 12 in housing member 13, in the rear of the carriage.

Figure 9:
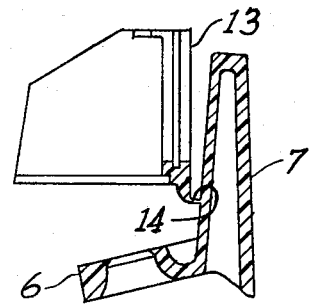
FIGURE 9 is a sectional side view of the hinge connection of the foot pedal to the housing.
Figure 4:
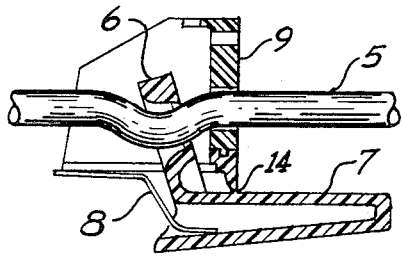
FIGURE 4 is a cross sectional side view of the cord lock mechanism, the cord in locked condition.
Figure 7:
FIGURE 7 is a top view of the closed cord bushing.
Figure 8:
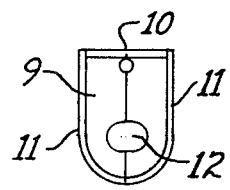
FIGURE 8 is a front view of the bushing of FIGURE 7.
Figure 5:
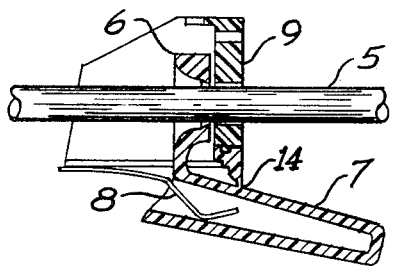
FIGURE 5 is similar to FIGURE 4 but showing the cord in unlocked condition.
Figure 6:
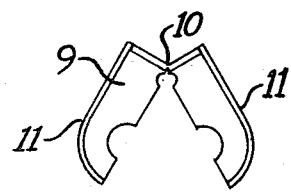
FIGURE 6 is a front view of the cord bushing in open position.

The cord lock mechanism is mounted against the lower edge of housing member 13 by hinge 14, termed a living hinge or self hinge, so-called in the art because it is integral with both leaves of the hinge as in the case of molded plastic parts so joined. The mechanism consists of foot pedal 7 pivotable on hinge 14 along its entire length on the lower edge of member 13 and integral with cord lock 6 as best seen in FIGURES 4, 5 and 9. Cord lock 6 is a bifurcated member adapted to receive cord 5 between its branches and when the opening between the branches is in registry with hole 12, cord 5 is free to pass through them.

Spring 8 attached to carriage 1 urges pedal 7 upward as in FIGURE 4 whereby cord lock 6 is placed out of registry with hole 12 causing cord 5 to be held in place. When pedal 7 is depressed to the position shown in FIGURE 5 the cord lock releases cord 5.

With the construction as shown, cord 5 may be withdrawn from the housing by pulling on its free end. In so doing cord lock 6 will readily free the cord. Upon release of external tension on the cord, the cord lock will as the result of the action of spring 8 again ensnare cord 5 and hold it stationary. To permit rewinding of cord 5 on reel 4, pedal 7 is depressed, giving the cord free passage through hole 12 and cord lock 6.

To eliminate the task of threading cord 5 through hole 12 after the appliance is fabricated, bushing 9 is provided as a component part. Bushing 9 is made of two halves hinged at 10. Each half has an opposing semi-circular notch so when brought together hole 12 is created. Ribs 11 are formed on the vertical edges of the bushing so when it is inserted in a mating opening in the top of member 13 it will be fixed in place.

To incorporate cord 5 in the housing the cord is placed between the opened bushing 9 which is then closed about cord 5 but leaving it free to pass through hole 12. Next the bushing is inserted in housing member 13 in force fit engagement. Cord 5 may then be placed between the branches of cord lock 6 to complete its positioning within as well as through the housing.

It is obvious that modifications may be made in the illustrated construction without departing from the spirit of this invention, and by giving but one illustration of its use I do not thereby intend to limit the scope of my invention.

I claim:
1. A cord lock mechanism comprising
    a spring tensioned rotatable reel mounted in a housing,
    a lever integral with, pivotable on, and extending outwardly horizontally from, the lower edge of said housing,
    a bifurcated member integral with the lever and extending upward inside said housing,
    said housing having an opening formed therein in registry with the opening in the bifurcated member when the lever is depressed,
    a spring urging the lever upward, and
    an extensible cord carried on the rotatable reel with its free end passing through the opening in the bifurcated member and through the opening in the housing.
2. A cord lock mechanism comprising
    a spring tensioned rotatable reel mounted in a floor borne housing,
    a pedal integral with, pivotable on, and extending outwardly horizontally from, the lower edge of said housing,
    a bifurcated member integral with the pedal and extending upward inside said housing,
    said housing having an opening formed therein in registry with the opening in the bifurcated member when the pedal is depressed,
    a spring urging the pedal upward, and
    an extensible cord carried on the rotatable reel with its free end passing through the opening in the bifurcated member and through the opening in the housing.

3. A cord lock mechanism comprising
a spring tensioned rotatable reel mounted in a floor borne housing,
a pedal integral with, pivotable on, and extending outwardly horizontally from, the lower edge of said housing,
a bifurcated member integral with the pedal and extending upward inside said housing,
said housing having an opening formed therein in registry with the opening in the bifurcated member when the pedal is depressed, the housing opening being provided by a separable bushing seated in closed condition in the housing,
a spring urging the pedal upward, and
an extensible cord carried on the rotatable reel with its free end passing through the opening in the bifurcated member and through the opening in the housing, 4. A cord lock mechanism comprising
a spring tensioned rotatable reel mounted in a floor borne housing,
a pedal integral with, pivotable on, and extending outwardly horizontally from, the lower edge of said housing,
a bifurcated member integral with the pedal and extending upward inside said housing,
said housing having an opening formed therein in registry with the opening in the bifurcated member when the pedal is depressed, the housing opening being provided by a separable bushing seated in closed condition in an open ended slot in the housing,
a spring urging the pedal upward, and
an extensible cord carried on the rotatable reel with its free end passing through the opening in the bifurcated member and through the opening in the housing.

References Cited

UNITED STATES PATENTS

| 2,164,949 | 7/1939 | Schreiber | 24—130 |
| 2,348,966 | 5/1944 | Dow et al. | 15—323 X |
| 2,794,513 | 6/1957 | Hultberg et al. | 15—323 X |
| 2,948,913 | 8/1960 | Tamarin | 15—323 |
| 3,178,128 | 4/1965 | Meletti | 242—107.2 |
| 3,251,107 | 5/1966 | Scott | 15—323 X |
| 3,317,077 | 5/1967 | Braginetz et al. | 220—31 |

FOREIGN PATENTS

| 1,256,974 | 5/1960 | France. |
| 816,416 | 7/1959 | Great Britain. |

WILLIAM S. BURDEN, *Primary Examiner.*